Nov. 11, 1969   E. B. JONES   3,477,664
FLUTTER WING FOR A SAILPLANE
Filed Oct. 11, 1967

INVENTOR
*EDWARD B. JONES*

BY *Walter G. Finch*
ATTORNEY

United States Patent Office 3,477,664
Patented Nov. 11, 1969

3,477,664
FLUTTER WING FOR A SAILPLANE
Edward B. Jones, General Delivery,
Perryman, Md. 21130
Filed Oct. 11, 1967, Ser. No. 674,534
Int. Cl. B64c 31/02
U.S. Cl. 244—16  6 Claims

ABSTRACT OF THE DISCLOSURE

Air turbulence supplements thermal lift in the sailplane of this invention. The wing is mounted on one rear and two forward trunnions. The forward trunnions hinge the wing to the main struts extending from the sailplane fuselage. The rear trunnion links to the fuselage through a movable strut which terminates in a pilot controllable delay dashpot. The angle of attack of the wing is thus made to follow with controlled delay the inertial and lifting forces to provide a flutter type of forward propulsion.

---

This invention relates generally to aircraft, and more particularly it pertains to aircraft propulsion through the medium of an automatically beating wing.

Sailplanes utilize the energy of thermals for lift. All forward movement is a result of glide. Another free energy not heretofore utilized is that of air turbulence. This exists in the form of simple and complex waves caused by the wind blowing over obstacles or by advancing weather fronts. An analogy is the rippling of water in a stream where there are bottom rocks.

Air turbulance is particularly noticeable on windy days below 1000 feet and is a well-known hazard on landing approaches or low flying.

It is an object of this invention, therefore, to provide a sailplane arrangement which utilize the air turbulance force for forward propulsion and at the same time to reduce the hazards of turbulance.

Another object of this invention is to provide an aircraft wing having a self-adjusting angle of attack for greater efficiency.

Still another object of this invention is to provide a shock absorber to smooth the flight of an aircraft.

Figure 2:
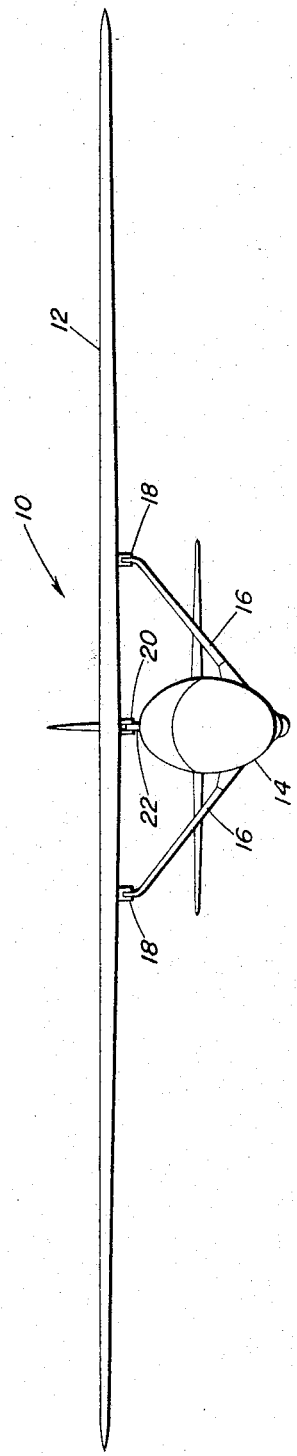
Figure 1:
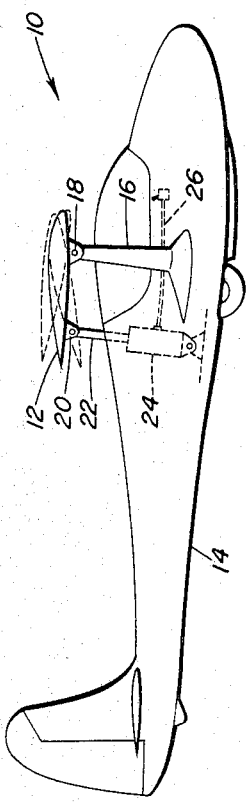

Other objects and advantages of this invention will become more apparent and understood from the following detailed specification and accompanying drawings in which:

FIG. 1 is a side elevation of a sailplane incorporating features of this invention; and FIG. 2 is a front elevation of the sailplane of FIG. 1.

Referring now to the details of the invention as shown in the drawings of FIGS. 1 and 2, reference numeral 10 indicates generally a sailplane. This sailplane 10 is provided with a wing 12 which is joined to the fuselage 14 in a novel, useful manner. The underside of the wing 12 forward of the center of lift is provided with a pair of spaced trunnions 18. The wing 12 is in this manner hinged in effect to the main struts 16 extending from the fuselage 12 as best shown in FIG. 2.

At a point on the rear underside of the wing 12 and on the center line thereof a single trunnion 20 is mounted. This trunnion 20 connects to a movable strut 22 which terminates in a spring centered dashpot 24 mounted inside the fuselage 14.

It will be noted that with this three point trunnion arrangement, a change in angle of attack of the wing 12 referenced to the fuselage 14 is resisted only through the spring and frictional effect of the dashpot 24. The control for adjusting the degree of resistance is available to the pilot and shown in FIG. 1 as a linkage 26. This may be a variable orifice, well known in the art of dashpots.

In principle and somewhat in practice this dashpot 24 is like a shock absorber on automobiles. However, in connection with the wing 12 a useful forward thrust is given the sailplane 10 by such action. This comes about because the force of inertia acts upon the wing 12 during turbulance. During periods of greater than normal gravity, the spring of the dashpot 24 will compress, the wing 12 will decrease its angle of attack and the airspeed of the sailplane 10 will increase. The increase of airspeed represents a gain of energy.

During period of less than normal gravity, the spring of dashpot 24 will expand, the wing 12 will increase its angle of attack and the sailplane 10 will gain altitude. This also represents a gain of energy. Thus, for any variation in gravity due to turbulance, a gain of energy is realized for powering the sailplane.

An associated feature of this novel sailplane is that the riding qualities are smoother as the bumps are overcome. Further, because of the ability of the sailplane 10 to vary the pitch of its wing automatically, stress on the wing spar will be almost constant, eliminating danger of over-stress in turbulance.

Since the control of the dashpot 24 is in the hands of the pilot, it is possible to go through any degree of the above related action from complete immobility to very soft action in a simple manner.

It is not intended that this arrangement of trunnioned wing replace any of the normal controls, such as the aileron or flap. However, because of the trunnion movement, mechanical linkage thereacross may be difficult. If hydraulic control for the aileron etc. is used, this is no obstacle since a flexible hose easily bypasses the trunnion.

A further benefit is gained from the arrangement described in the automatic tendency of the sailplane 10 to center thermals. Upon entering the lift, the force of gravity increases so the angle of attack of the wing increases with a consequent speed increase. Because of this speed increase, the turning radius will automatically change resulting in a wider swath or deeper bite taken into the thermal.

On leaving the thermal, the force of gravity becomes less than normal so the angle of attack of the wing increases. With this angle increased, the radius of curvature will be decreased and the sharper turn will tend to make the sailplane 10 approach closer to the thermal all without a change in yaw. With this automatic action a beginner will find the improved sailplane 10 much simpler to fly than conventional fixed wing glider craft.

Obviously many modifications and variations of the present invention are possible in light of the above teachings.

What is claimed is:

1. In combination, structure defining a sailplane having a fuselage and a wing for said fuselage, symmetrically positioned and upwardly extending fixed strut members positioned on said fuselage, symmetrically spaced first and second trunnion means secured to the underside of said wing forward of the center of lift and coupled to the upper ends of said strut members, a third trunnion means secured to the rear underside of said wing and positioned in the center line thereof. a dashpot mounted inside of said fuselage, and movable strut means having one end coupled to said third trunnion means and its other end terminating in said dashpot.

2. In the combination as recited in claim 1, wherein said dashpot is spring-centered.

3. In the combination as recited in claim 2, and additionally variable orifice means for controlling said dashpot.

4. In a sailplane having a fuselage, a wing for said fuselage, and upwardly extending fixed strut members positioned on said fuselage, a system for mounting said wing for automatically controlled variable pitch of said wing including symmetrically spaced first and second trunnion means secured to the underside of said wing forward of the center of lift and coupled to the upper ends of said strut members, a third trunnion means secured to the rear underside of said wing and positioned in the center line thereof, a dashpot mounted inside of said fuselage, and movable strut means having one end coupled to said third trunnion means and its other end terminating in said dashpot.

5. In a sailplane as recited in claim 4, wherein said dashpot is spring-centered.

6. In a sailplane as recited in claim 5, and additionally variable orifice means for controlling said dashpot.

References Cited

UNITED STATES PATENTS

| | | | |
|---|---|---|---|
| 2,286,150 | 6/1942 | Mercier | 244—42 |
| 1,903,752 | 4/1933 | Belizzi | 244—48 |
| 1,878,723 | 9/1932 | Stalker | 244—48 |
| 1,882,199 | 10/1932 | Sparhawk | 244—48 |
| 1,931,809 | 10/1933 | Ballou et al. | 244—48 |
| 2,541,922 | 2/1951 | Hosford | 244—48 X |

FOREIGN PATENTS 256,725   1/1928   Italy.

MILTON BUCHLER, Primary Examiner

J. L. FORMAN, Assistant Examiner

U.S. Cl. X.R.

244—48